United States Patent [19]

Kirtley, Jr. et al.

[11] 3,999,091
[45] Dec. 21, 1976

[54] SUPERCONDUCTING MACHINE HAVING WOUND DAMPER-SHIELD WINDING

[75] Inventors: James L. Kirtley, Jr., Brookline; Joseph L. Smith, Jr., Concord, both of Mass.

[73] Assignee: Massachusetts Institute of Technology, Cambridge, Mass.

[22] Filed: Nov. 13, 1974

[21] Appl. No.: 523,604

[52] U.S. Cl. .............................. 310/52; 310/40 R
[51] Int. Cl.² .................................. H02K 9/00
[58] Field of Search ............ 310/10, 40, 52, 198, 310/201, 205, 54, 165; 318/138, 195, 254

[56] References Cited

UNITED STATES PATENTS

| | | | |
|---|---|---|---|
| 3,242,418 | 3/1966 | Mela | 310/10 |
| 3,373,327 | 3/1968 | Teuber | 310/52 |
| 3,644,766 | 2/1972 | Hughes | 310/165 |
| 3,648,082 | 3/1972 | MacNab | 310/10 |
| 3,679,920 | 7/1972 | MacNab | 310/10 |
| 3,742,265 | 6/1973 | Smith | 310/52 |
| 3,743,867 | 7/1973 | Smith | 310/52 |
| 3,764,835 | 10/1973 | Luck | 310/10 |
| 3,781,578 | 12/1973 | Smith | 310/52 |
| 3,816,780 | 6/1974 | Smith | 310/52 |

Primary Examiner—Gene Z. Rubinson
Attorney, Agent, or Firm—Arthur A. Smith, Jr.; Robert Shaw; Martin M. Santa

[57] ABSTRACT

A superconducting machine having a wound damper-shield winding disposed in the cold region of the machine and having electrical leads to a warm region. Electric current control means at the warm region is connected to the leads and acts to pass current in a predetermined pattern as a function of voltages that appear across the leads as a consequence of transients in the machine.

16 Claims, 14 Drawing Figures

SUPERCONDUCTING MACHINE HAVING WOUND DAMPER-SHIELD WINDING

The present invention relates to superconducting machines that have incorporated therein mechanisms to shield the superconducting field winding from transients and to damp electric currents induced by such transients.

Attention is called to U.S. Pat. No. 3,472,265 (Smith, Jr.) which addresses, among other things, the problem of isolating the superconducting field and related elements of a superconducting machine from the effects of transient conditions; a large number of patent applications and writings are made of record in said Letters Patent. In addition attention is called to U.S. Pat. No. 3,764,835 (Luck et al) and a Kirtley, Jr. et al application Ser. No. 523,603 filed Nov. 13, 1974 that accompanies herewith.

All superconducting machine designs conceived of to date contain some form of thermal/magnetic shielding of the cold parts of the rotor. In early designs (for example an experimental 2MVA machine at the Massachusetts Institute of Technology), the thermal and magnetic functions were combined in what was called the "electrothermal shield". This is a cylindrical shell of a material that is both a good electrical and thermal conductor, operating at a temperature that is intermediate between the coldest parts of the machine and ambient.

The purpose of the electrothermal shield is two-fold: it serves both as an intermediate temperature shell to intercept thermal radiation and as a magnetic shield to attenuate alternating magnetic fields in the superconducting parts of the machine.

There are two major problems with the cryogenic electrothermal shield. First, the machine requires some sort of amortisseur, or electrical damper winding; the electrothermal shield, if it is cryogenic, will probably have a resistivity much too low to constitute a good damper. If it is made of high resistivity material, its effectiveness as a shield suffers. Second, if the machine is subjected to a sudden short circuit, there will be a very large crushing load applied to the shell; since machines must be built to survive severe short circuit conditions, the shell must be very strong (i.e., thick).

The first problem above is addressed by Luck and Thullen in their double-shielded machine; see said U.S. Pat. No. 3,764,865. In that machine, the functions of shielding and damping are separated: a cold high conductivity shell serves as a magnetic and thermal shield, while a separate shell, operating at ambient temperature a serves as a damper.

The second problem remains, and is made somewhat more severe by using the double-shield. The damper shell must be strong enough to withstand fault forces, and must have enough leakage reactance (with respect to the inner, shielding shell) to be a good damper. Both of these requirements take radial space and adding radial space between the field winding and armature reduces power density severely.

Accordingly, it is an object of the present invention to provide a damper/shielding winding that can easily be made strong and that provides a reasonable compromise between damping and shielding.

These and still further objects are evident in the description that follows and are delineated in the appended claims.

The foregoing objects are achieved in a superconducting machine having a normally conducting armature winding, superconducting field winding and a wound damper-shield winding disposed between the other two. The damper-shield winding is disposed in the cold region of the machine and has electrical conducting leads to carry electric current from the cold region to a warm region. The leads are connected to electric current control circuitry at the warm region, which circuitry acts to pass current in response to voltages that appear between the leads as a consequence of transient conditions in the machine, and to control the current that thereby is caused to flow.

The invention is hereinafter described with reference to the accompanying drawing in which:

FIGS. 3A, 3B and 3C show possible current-voltage characteristic for the current control circuitry;

Figure 7:
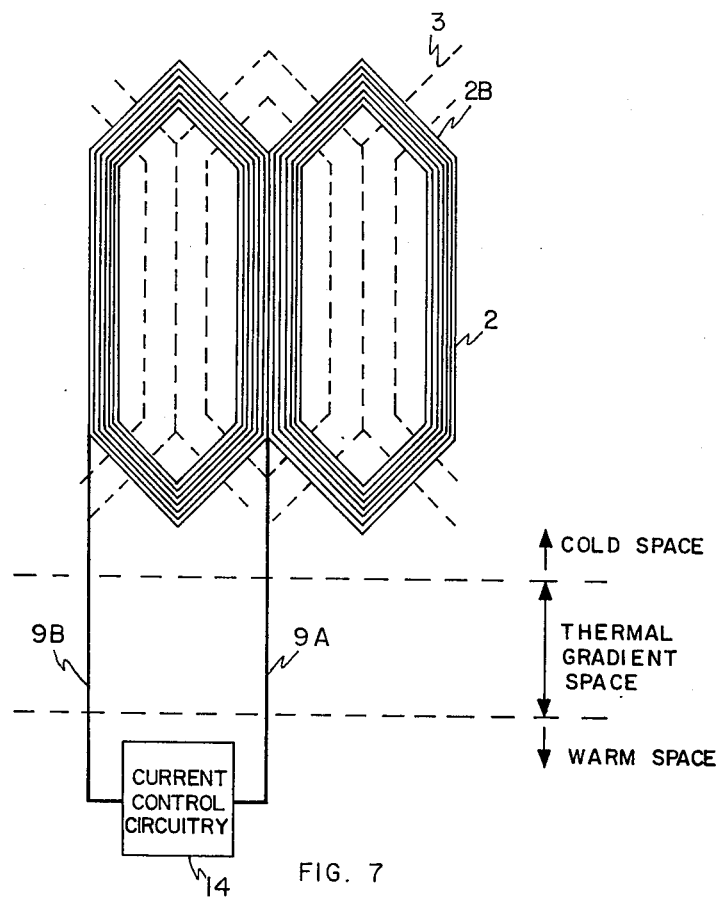
FIG. 7 shows a superconducting field winding (i.e., the broken lines) and a damper-shield winding in which the coils thereof are disposed at the quadrature axis of the superconducting field winding.
Figure 9:
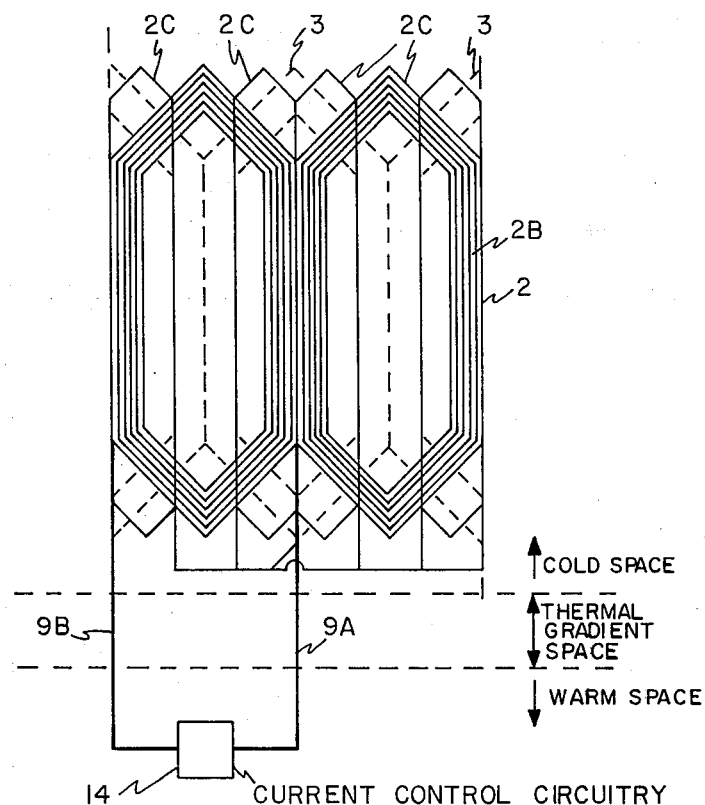
Figure 10:
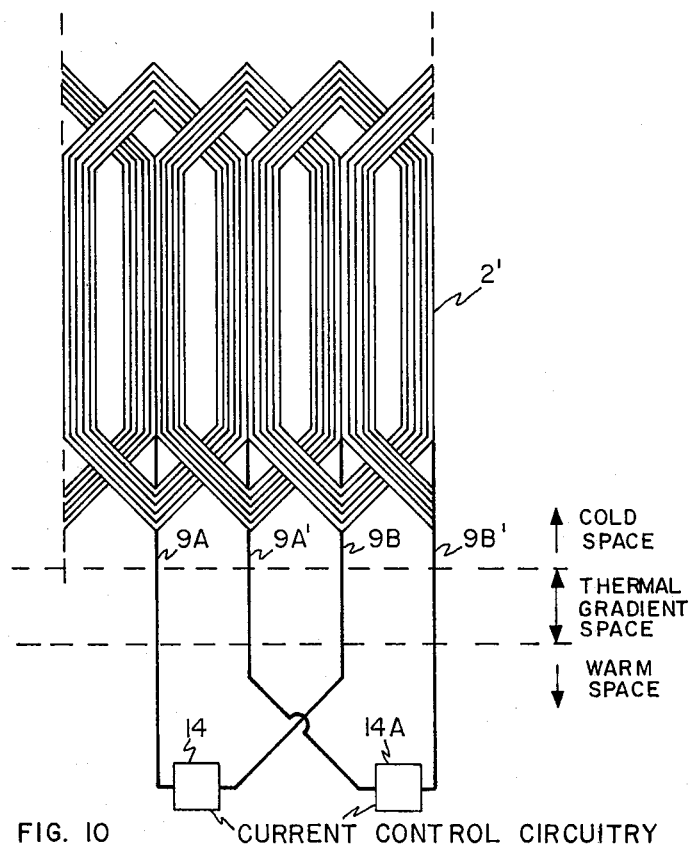

FIG. 9 again shows the elements of FIG. 7 but has further damper-shield coils that make up a composite damper-shield winding in which at least some of the coils thereof have different numbers of poles than others and in which some of the coils are shorted in the cold region of the machine; and FIG. 10 shows schematically a two-phase damper-shield winding and two current control circuits.

Before going into a detailed discussion of the invention, there first follows a general discussion to serve as a foundation for what then follows.

Present state of the art designs for superconducting machines have a superconducting field winding on the rotor. The rotor is surrounded by an intermediate temperature radiation shield and then by a room temperature magnetic shield and damper. In order to avoid excessive heat leak to the superconducting rotor winding, the room temperature magnetic damper-shield must be a self-supporting tube with a vacuum gap between the inside of the shield and the S.C. wound rotor. A major problem with this design is that the shield structure must be quite heavy to withstand the stress of the crushing magnetic pressure produced by a terminal short circuit on the machine.

An additional problem is that the requirements for shielding with low electrical losses (high conductivity, thick shell) and the requirements for optimum damping of machine's oscillations are in conflict. Significant electrical dissipation is required for proper action as a damper.

The concept of this invention is to employ a set of cryogenic windings separate from the field winding to provide the magnetic shielding function and the damper function. These windings will have very low losses in the cryogenic area of the rotor. The windings will be connected by means of current leads to appropriate electrical elements at room temperature. In this way the electrical dissipation required for proper damping (i.e., optimum time constant) can be provided at room temperature. Thus the electrical dissipation necessary for damping can be transferred directly to the environment without increasing the refrigeration load of the cryogenic refrigerator (i.e., helium liquefier) for the machine. A room temperature damping resistor or other electric current control circuitry can be mounted on the room temperature parts of the rotor, thus avoiding the necessity for additional slip rings. The external leads on the damper winding also provide the possibility of replacing the damping resistor with an active network and a control system to provide active or forced damping. The damper winding may be wound with modern low-AC-loss composite superconductors in order to achieve minimum dissipation at liquid helium temperature and maximum current density. With a high current density the winding will require the smallest volume in the active volume of the machine. The damper winding can also be wound with finely stranded and transposed aluminum or copper wire. Although normally (ohmically) conducting, the conductivity of the material is quite high. Electrical losses will be minimized since the damping currents in the high-conductivity winding will be small, except during machine transients.

The second feature of this invention is to magnetically shield the main superconducting field winding with cryogenic windings at the exterior of the rotor. For maximum shielding efficiency these windings should allow the AC shielding currents to flow with minimum resistance and dissipation. A shield made in the form of a high conductivity (cryogenic cylindrical tube provides shielding with maximum efficiency; however, the shielding is so effective that machine response to the exciter controller is very slow. In addition, each change in the main field requires a significant energy dissipation in the shield as the change in the magnetic field penetrates. In this invention the cryogenic conducting-tube shield is replaced by cryogenic windings that have current leads going to room temperature. In steady operation the shield windings are short circuited (actually or effectively) at room temperature and shield very efficiently.

During a machine transient, an exciter controller will command changes in the excitation level of the main field. In order that the shield windings not counteract the commanded changes in main field strength, the shield windings will be forced (that is, a voltage will be applied) by a room temperature control system (e.g., auxiliary exciter) in such a manner as to pass the commanded field change. After the transient in the main field, the shield windings will return to operation with an effective short circuit at room temperature. The simplest way to achieve the required voltage on the shield winding during a transient in the main field is simply to open circuit the shield windings during a transient in the main field.

The shield windings, as hereinafter noted, are arranged to shield the main superconducting winding from negative sequence fields and third harmonic fields. Shielding for fifth and higher harmonic fields can also be provided if required. The shield windings may be low-loss AC superconductors or stranded and transposed high-conductivity normal conductors.

A major advantage of the cryogenic shield windings is that they may be operated at or near the same temperature as the main field winding. Thus the shield may be supported directly on the main rotor without a vacuum gap in between. The severe crushing loads that are placed on the shield during a short circuit are thus carried directly across the rotor by compression of the low temperature parts of the rotor. The heavy structure required to prevent ovalization of the room temperature shield is thus eliminated. The use of the wound cryogenic shield does however require a torque tube capable of carrying all transient torques.

The optimization of the design of a superconducting machine with a wound cryogenic shield and damper provides a machine with the best transient characteristics, including optimum damping without excessive cryogenic refrigeration.

Referring now to FIG. 1, a superconducting machine is shown at 101 comprising a rotor 102 that contains a superconducting field winding 3, and an stator 103 with a normally conducting, polyphase armature winding 8. Stator windings and structures are the subject matter of many published works; therefore, no elaboration is needed in that regard in this specification since it is the elements on the rotor that are highlighted here because, as noted above, the superconducting portions of machines proposed to date are on the rotor.

Figure 1A:
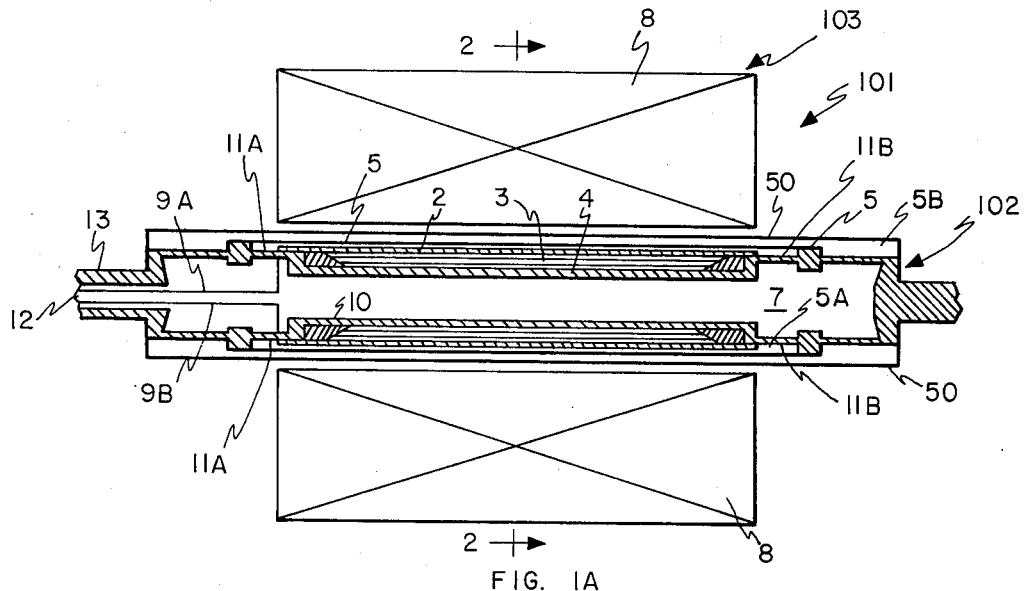
FIG. 1A is a side section view, partly diagrammatic in form, showing a superconducting machine having a superconducting field winding on the rotor and a damper-shield winding immediately adjacent the field winding.
Figure 1B:
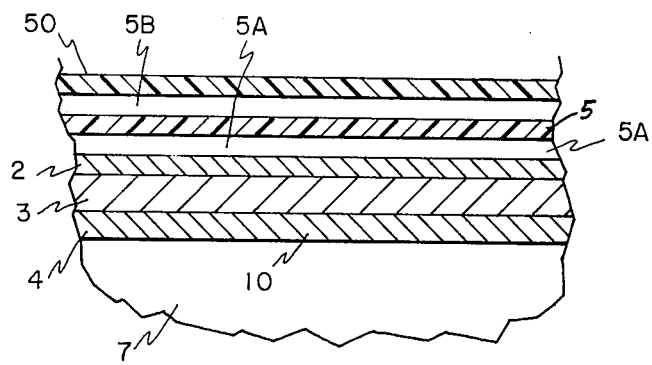
FIG. 1B is an enlarged section view of portions of the rotor of the machine of FIG. 1A.

Immediately adjacent the superconducting field winding 3 there is a wound damper-shield winding 2 that is disposed radially outward from the winding 3 between the superconducting field winding 3 and the normally conducting armature 8. As used herein the hyphenated term "damper-shield" denotes a winding which acts, together with the electric current control circuitry hereinafter described, to damp oscillations occasioned by transients and to effect electromagnet shielding. The damper-shield winding 2 is disposed in the cold region of the rotor 102; hence it is at or near the temperature of liquid helium. Electric leads 9A and 9B from the winding 2 connect it to the current control elements now described, but a preliminary remark is in order. Two leads only, 9A and 9B are shown in FIG. 1 indicating that the damper-shield winding 2 is a single-phase structure; such structure is illustrated for simplicity of explanation only and that procedure is continued as to the other circuit elements, but in many, or most, situations for which the present invention is intended, the damper-shield winding will contain two or more phases. Note that the superconducting field winding 3 has a pair of leads which, for simplicity, are not shown. The leads 9A and 9B connect to circuit elements that act to control current in the damper-shield winding, as discussed in the paragraphs that follow, but first a few further rotor details are noted with reference to FIGS. 1A, 1B and 2.

Figure 2:
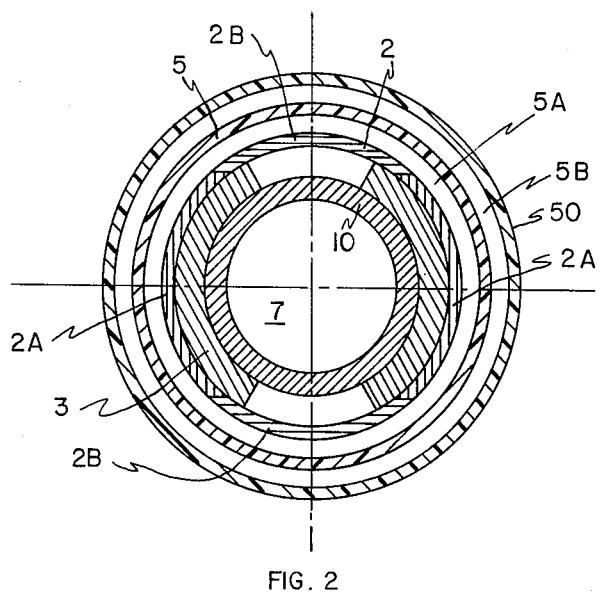
FIG. 2 is an enlarged view taken upon the line 2—2 in FIG. 1A and looking in the direction of the arrows.

The rotor 102 further includes a supporting tube 10 that supports both the main field winding 3 and the damper-shield winding 2, the latter of which, as shown in FIG. 2, comprises direct axis coils 2A and quadrature axis coils 2B. The inside space marked 7 is a vacuum space. Helium used to cool the rotor enters through a central opening 12 in the rotor shaft designated 13, as is well known. Thermal distance pieces or torque tubes 11A and 11B support the inner structure in the cold region of the machine 101, i.e., the supporting tube etc. at cryogenic or near cryogenic temperatures. A magnetically transparent thermal radiation shield 5 isolates the cold region from the warm region (i.e., room temperature) in the surrounding environment. The radiation shield 5 is separated from the winding 2 by a vacuum space 5A and from a further thermal shield 50A that is also magnetically transparent by a vacuum space 5B. The shields 5 and 50 are supported only at their ends as shown; they can be made of metal strips on a non-conductive support structure. Thus, the damper-shield winding consists of discrete turns on the surface of the superconducting windings (the machine 101 can, of course, have four or more poles rather than the two-pole structure shown), that operate at about the same temperature as the superconducting winding and that are connected through thermally isolating leads to appropriate circuit elements at higher (probably ambient) temperatures.

Figure 3A:
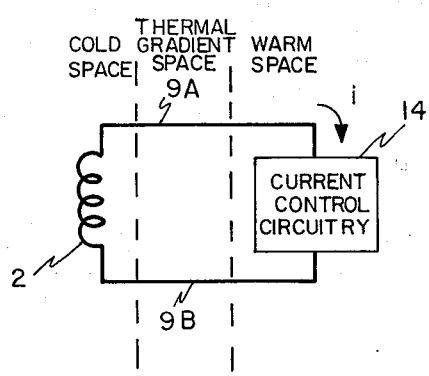
FIG. 3A shows schematically a damper-shield winding disposed in the cold region of the machine and connected to current control circuitry in a warm or warmer region (e.g., the ambient)
Figure 3B:
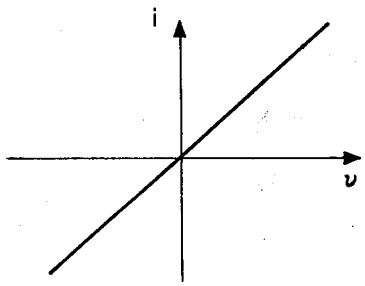
Figure 4:
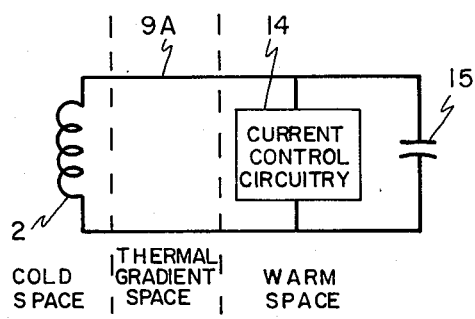
FIGS. 4, 5 and 6A show available current control circuitry, FIG. 5 illustrating completely passive devices and FIG. 6A illustrating some active devices as well as a passive circuit element.
Figure 3C:
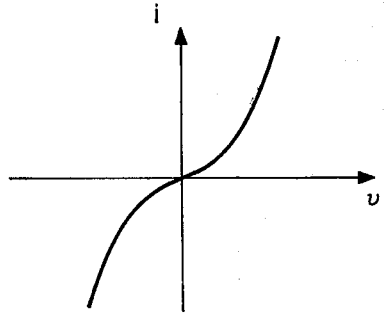
Figure 5:
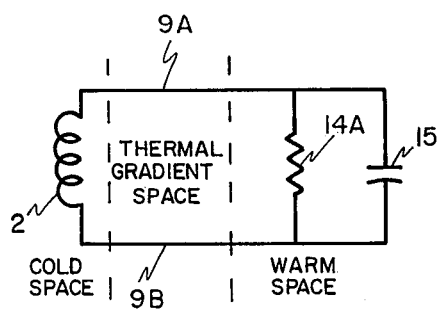
Figure 6B:
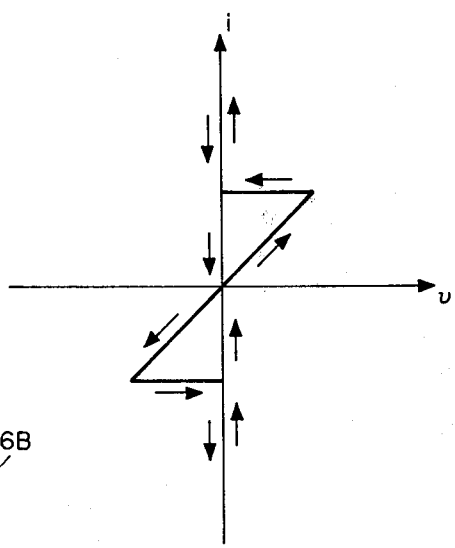
FIG. 6B shows the circuit-voltage characteristics for the circuitry of FIG. 6A.

In FIG. 3A the damper-shield winding is shown connected to current control circuitry 14 that can be, for example, a dissipation element having the linear resistant current-voltage characteristics of FIGS. 3B or the non-linear current-voltage characteristics of FIG. 3C. The circuit elements in the block 14 can have the characteristics of a Thyrite device used in lightning arrestors, that is, the slope of the current-voltage characteristics increases as the voltage increases. FIG. 4 shows a capacitance 15 in parallel with the circuitry 14, and FIG. 5 shows current control means comprising a resistance 14A and the capacitance 15 in combination. The foregoing control elements are passive. The active current control circuitry of FIG. 6A includes the resistance 14A in combination with thyristors 16A and 16B connected in parallel in opposite polarity. FIG. 6B shows the type of current-voltage characteristics of the circuitry of FIG. 6A. Some general considerations and further comment on the current control circuitry now follow.

The main purposes of the damper-shield winding 2 are to shield the superconducting field winding 3 from strong AC fields due to unbalanced faults and due to the DC components of faults; also, the winding 2 serves to trap flux during post-fault/reclose swings, to maintain internal voltage and help the machine recover synchronism. In addition, the winding 2 acts as a damper winding and to shield the cold space of the machine 101 from smaller AC fields due to system unbalance, time harmonics on the system, and armature space harmonics.

The damping function above is not consistent with the shielding functions. To be a good damper winding, the shield winding must have a time constant roughly comparable to the swing period of the machine. This implies a relatively large resistance. On the other hand, the shielding functions require as small a resistance as possible.

A current control circuit having the current-versus-voltage characteristic of FIG. 3C serves to satisfy the above damping and shielding requirements of the device and might be described as a voltage-limiter, like lightning arrestors. The limiting voltage for this device would be such that the maximum allowed rate of change of flux through the shield winding 2 would be small. The small-signal resistance of the device would be such that the shield time constant would be correct for optimum damping of small swings.

With current limiting characteristics of FIG. 3C, the shield winding would perform quite well for high frequency AC fields because the time constant of the shield would be fairly long. This performance could be improved further by connecting a large capacitance (the capacitance 15) in parallel with the non-linear element: see FIG. 4. This would serve to reduce the impedance of the shield to high frequency fields, and thus provide better shielding.

Figure 6A:
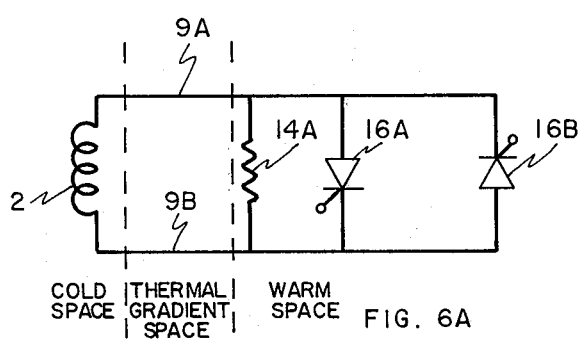

In the variation of FIG. 6A the gates of the thyristors 16A and 16B can be arranged to fire when the voltage exceeded a particular level. The level can be chosen to provide the current-voltage characteristics of FIG. 6B and such characteristics will result in reasonable damping and good transient flux trapping. The characteristic in FIG. 6B exhibits hysteresis: for small swings the thyristors will not fire and the circuit will have adequate damping. For large swings the thyristors will fire, and trap flux. If the thyristor firing circuits are made dependent on thyristor voltage only, the circuit will be self-resetting: that is each thyristor will turn off after its half cycle of swing. Alternately, the thyristor firing circuits can be controlled by a more sophisticated device that could (for example) recognize the end of the critical swing period, and prevent the thyristor from firing. This would enhance the machine damping after a transient swing.

It should be noted with regard to the various current control circuitry herein disclosed that any damping resistor, non-linear resistor, or thyristor and controller can be located on the rotor, thus eliminating the need for slip rings.

Figure 8:
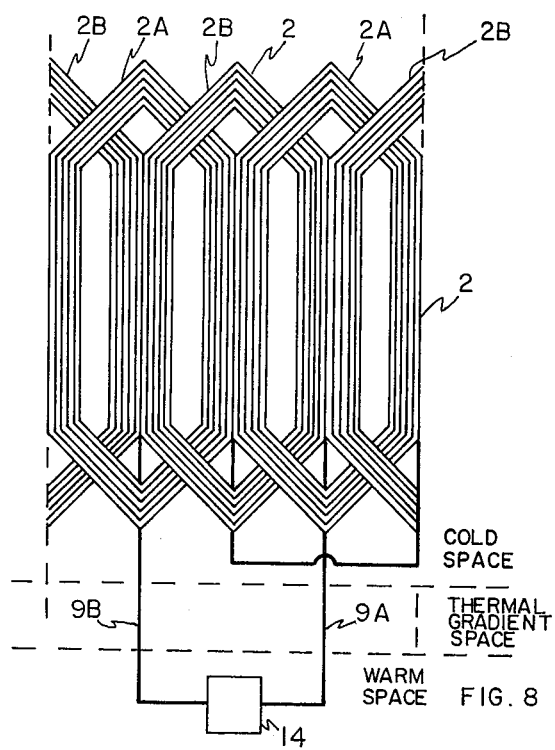
FIG. 8 illustrates a damper-shield winding comprising coils disposed at the quadrature axis of the superconducting field winding and further coils at the direct axis thereof.

The damper-shield winding 2 of FIG. 7 is a two-pole winding, like the superconducting field winding, and, is in fact, the winding 2B of FIG. 2. The example in FIG. 8 has a damper-shield winding 2 that comprises two coils 2A and 2B in FIG. 2, each with the same number of poles as the superconducting field winding 3. The rotor depicted in FIG. 9 has the two-pole, damper-shield coils 2B, as in FIG. 7, but has also a plurality of damper-shield coils 2C each of which is shorted in the cold region, as shown, and that together form a further damper-shield winding. The damper-shield coils 2C form a six-pole winding. Additional damper-shield windings having two, four or more poles can be formed in the rotor to shield the superconducting field winding from the transient fields and space-harmonic fields. It is not believed that any further illustrations are required to show higher-harmonic shielding.

The damper-shield winding labeled 2' in FIG. 10 is polyphase (i.e., two-phase in the example shown); it can have the same number of poles as the superconducting field winding, but need not. One phase of the winding 2' is shown connected to the current control circuitry 14, as before, and the other phase is connected by conductors 9A' and 9B' to current control circuitry 14A similar to the current control circuitry 14. It will be appreciated that combinations of the coils in FIGS. 7–10 can be employed to form a composite damper-shield winding thereby to optimize or make possible the necessary functions.

Modifications of the invention herein disclosed will occur to persons skilled in the art and all such modifications are deemed to be within the spirit and scope of the invention as defined by the appended claims.

What is claimed is:

1. A superconducting machine having, in combination, a rotor with a superconducting field winding;
a stator with a normally conducting polyphase armature;
a wound damper-shield winding disposed between the superconducting field winding and the normally conducting armature, said damper-shield winding being disposed in the cold region of the machine and having current conducting leads to a warm region; and
electric current control means at the warm region connected to said leads and adapted to pass current in response to voltages that appear between said leads.

2. A superconducting machine as claimed in claim 1 in which said current control means comprises a linear resistance.

3. A superconducting machine as claimed in claim 1 in which said current control means presents non-linear current voltage characteristics.

4. A superconducting machine as claimed in claim 3 in which the current-voltage characteristics of the current control means is such that the slope of the current voltage characteristic increases as the voltage increases.

5. Apparatus as claimed in claim 4 in which the current control means further includes capacitance means.

6. A superconducting machine as claimed in claim 1 in which the current control means comprises a resistance and at least one active control element to control the current voltage characteristic of the current control means.

7. A superconducting machine as claimed in claim 6 in which the active control element comprises a thyristor.

8. A superconducting machine as claimed in claim 7 in which the active control element comprises a pair of thyristors connected in parallel in opposite polarity.

9. A superconducting machine as claimed in claim 1 in which the current control means comprises a resistance and a capacitance, in combination.

10. A superconducting machine as claimed in claim 1 that includes at least one further winding that provides shielding, the further winding being shorted in the cold region.

11. Apparatus as claimed in claim 1 in which the damper-shield winding is polyphase.

12. Apparatus as claimed in claim 1 in which the damper-shield winding has the same number of poles as the armature.

13. A superconducting machine as claimed in claim 1 that includes a plurality of further windings to provide shielding, the further windings each being shorted in the cold region, at least one of the further windings having a number of poles that differs from the number of armature poles.

14. A superconducting machine as claimed in claim 13 in which at least one of the plurality of further windings is polyphase.

15. A superconducting machine as claimed in claim 1 in which the current control comprises active and passive circuit elements.

16. A superconducting machine having, in combination, a rotor with a superconducting field winding;
a stator with a normally conducting polyphase armature;
a wound damper-shield winding disposed between the superconducting field winding and the normally conducting armature, said damper-shield winding being disposed in the cold region of the machine and having current conducting leads to a warm region; and
damper-shield circuit means at the warm region connected to said leads and adapted to pass current between said leads and to develop voltages between said leads, said current flowing in the damper-shield winding to effect shielding of the superconducting field winding against variations in magnetic field in the region of the superconducting field winding, said current and voltages serving to provide damping power.

* * * * *